(12) United States Patent
Fahlenkamp et al.

(10) Patent No.: US 10,135,272 B2
(45) Date of Patent: Nov. 20, 2018

(54) SWITCHED MODE POWER SUPPLY CIRCUIT

(71) Applicant: Infineon Technologies Austria AG, Villach (AT)

(72) Inventors: Marc Fahlenkamp, Geretsried (DE); Martin Krueger, Oberschleissheim (DE); Doris Keitel-Schulz, Hoehenkirchen (DE); Sergio Rossi, Genoa (IT); Christian Wald, Dietramszell (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 0 days.

(21) Appl. No.: 15/848,914

(22) Filed: Dec. 20, 2017

(65) Prior Publication Data

US 2018/0115174 A1   Apr. 26, 2018

Related U.S. Application Data

(63) Continuation of application No. 14/603,664, filed on Jan. 23, 2015, now Pat. No. 9,887,564.

(60) Provisional application No. 61/939,575, filed on Feb. 13, 2014, provisional application No. 62/001,511, filed on May 21, 2014.

(51) Int. Cl.
```
H02J 7/00      (2006.01)
H01F 27/42     (2006.01)
H01F 37/00     (2006.01)
H02M 3/335     (2006.01)
H02M 1/32      (2007.01)
H02M 1/00      (2006.01)
H02J 7/02      (2016.01)
```

(52) U.S. Cl.
CPC .............. *H02J 7/0044* (2013.01); *H02J 7/00* (2013.01); *H02J 7/0052* (2013.01); *H02M 1/32* (2013.01); *H02M 3/33507* (2013.01); *H02M 3/33523* (2013.01); *H02J 7/025* (2013.01); *H02M 2001/0006* (2013.01); *H02M 2001/0009* (2013.01); *H02M 2001/0025* (2013.01)

(58) Field of Classification Search
CPC ....................................................... H02J 7/025
USPC ....................................................... 320/108
See application file for complete search history.

(56) References Cited

U.S. PATENT DOCUMENTS

| | | | |
|---|---|---|---|
| 8,269,432 | B2 | 9/2012 | Yang et al. |
| 8,537,574 | B2 | 9/2013 | Isogai et al. |
| 8,611,109 | B2 | 12/2013 | Roessler et al. |
| 2004/0210349 | A1 | 10/2004 | Lenz et al. |

(Continued)

FOREIGN PATENT DOCUMENTS

| | | |
|---|---|---|
| CN | 101815387 A | 8/2010 |
| CN | 102163920 A | 8/2011 |

(Continued)

*Primary Examiner* — Edward Tso
*Assistant Examiner* — Ahmed Omar
(74) *Attorney, Agent, or Firm* — Slater Matsil, LLP

(57) ABSTRACT

A switched mode power supply circuit includes a switching converter receiving an input voltage and generating an output voltage from the input voltage in accordance with a switching signal. A switching controller unit is configured to generate the switching signal in accordance with a control parameter set such that the output voltage matches a setpoint.

22 Claims, 7 Drawing Sheets

(56) References Cited

U.S. PATENT DOCUMENTS

| | | | |
|---|---|---|---|
| 2013/0093389 A1* | 4/2013 | Partovi | H01F 7/0252 320/108 |
| 2014/0088867 A1 | 3/2014 | Takaoka | |
| 2016/0218628 A1* | 7/2016 | Yao | H02M 3/33507 |

FOREIGN PATENT DOCUMENTS

| | | |
|---|---|---|
| CN | 102447394 A | 5/2012 |
| CN | 103502773 A | 1/2014 |

* cited by examiner

SWITCHED MODE POWER SUPPLY CIRCUIT

This application is a continuation of U.S. patent application Ser. No. 14/603,664, filed on Jan. 23, 2015, which claims the benefit of U.S. Provisional Application No. 61/939,575 filed Feb. 13, 2014, and U.S. Provisional Application No. 62/001,511 filed May 21, 2014, which applications are hereby incorporated by reference in their entireties.

TECHNICAL FIELD

The present disclosure relates to the field of switching converters and switched mode power supplies.

BACKGROUND

Switched-mode power supplies (SMPS) are commonly used and increasingly replacing "classical" power supplies composed of a transformer and a linear voltage regulator. SMPS use switching power converters to convert one voltage (e.g., an AC line voltage or a 13.8 V battery voltage) into another voltage, which may be used as supply voltage for an electric device or an electronic circuit. For example, switching power converters are widely used to charge batteries of mobile devices such as mobile phones, portable computers, portable electric drills, etc. Many different switching power converter topologies are known in the field, such as buck converters, boost converters, Ćuk converters, flyback converters, etc.

For safety reasons, it may be desirable that the power converter circuit includes galvanic isolation from between the input circuit (connected to the utility power grid) and the output circuit (providing the desired output voltage to a load). Usually, optocouplers are used to galvanically isolate a feedback signal representing the regulated output voltage from the input circuit of the power converter circuit. The power conversion is accomplished by using a transformer (included e.g., in a flyback converter). However, when a car battery is used as input voltage source (instead of the power grid) the galvanic isolation may be optional or even undesired.

The switching operation of a switching converter is controlled by a controller which may be optimized for a specific switching converter output voltage and for a specific range of input voltages. Dependent on the actual application it may be desirable to adjust the switching converter output voltage or the output power, and, when changing, e.g., the switching converter output voltage, the mentioned controller may operate in a sub-optimal (inefficient) state. Also the loop stability can be impacted by changing significantly the output voltage range. Furthermore, protection features such an over-voltage protection may be inoperative or not working properly in such sub-optimal state. Thus there is a need for improved switching converters which are able to efficiently provide stable output voltages of different nominal values.

SUMMARY OF THE INVENTION

A switched mode power supply (SMPS) circuit is disclosed herein. In accordance with various embodiments, the SMPS circuit includes a switching converter receiving an input voltage and generating an output voltage from the input voltage in accordance with a switching signal. A switching controller unit generates the switching signal in accordance with a control parameter set, such that the output voltage approximately matches a set-point that is set in accordance with a selection signal. A detection circuit detects the set-point or a change of the set-point and signals the detected set-point to the switching controller circuit. The switching controller unit then updates the control parameter set in response to a change of the set-point value.

In accordance with various other embodiments, the SMPS circuit includes a switching converter receiving an input voltage and generating an output voltage from the input voltage in accordance with a switching signal. The switching converter includes a transformer to provide a galvanic isolation between a primary side and a secondary side of the switching converter. A switching controller unit is configured to generate the switching signal in accordance with a control parameter set and dependent on input data received via a galvanically isolated transmission path. The input data includes a serial data stream provided by a load, which is supplied with the output voltage.

Furthermore, a charging circuit is described for charging a battery included in mobile devices. In accordance with various embodiments, the charging circuit includes a switching converter receiving an input voltage and generating an output voltage from the input voltage in accordance with a switching signal. The switching converter includes a transformer to provide a galvanic isolation between a primary side and a secondary side of the switching converter. A switching controller unit is configured to generate the switching signal in accordance with a control parameter set and dependent on input data received via a galvanically isolated transmission path. The input data includes a serial data stream provided by the mobile device, which is supplied with the output voltage.

In accordance with further embodiments, the SMPS circuit includes a switching converter receiving an input voltage and generating an output voltage from the input voltage in accordance with a switching signal. The switching converter includes a transformer to provide a galvanic isolation between a primary side and a secondary side of the switching converter. Furthermore, the switching converter includes a synchronous rectifier configured to rectify a secondary current of the switching converter. A switching controller unit is configured to generate the switching signal in accordance with a control parameter set and dependent on input data received via a galvanically isolated transmission path. The switching controller unit is configured to generate a drive signal for the synchronous rectifier, which is transmitted to the synchronous rectifier via a galvanically isolating transmission path.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
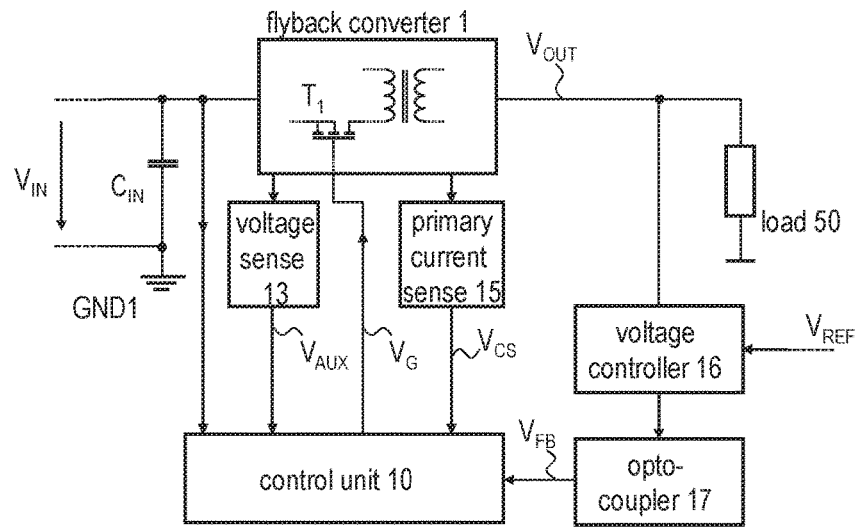
FIG. 1 illustrates the basic structure of a switched mode power supply (SMPS) circuit arrangement using a flyback converter topology and including output voltage control.

FIG. 1 illustrates the basic structure of a switched mode power supply (SMPS) circuit arrangement in accordance to one example of the present invention. The circuit arrangement comprises, as switching power converter, a flyback converter 1 which comprises a primary side and a secondary side which are galvanically isolated by a transformer, having a primary winding $L_P$ and a secondary winding $L_S$ (see also FIG. 2). The primary winding $L_P$ has $N_P$ turns and the secondary winding $L_S$ has $N_S$ turns. The primary winding $L_P$ of the flyback converter 1 may be coupled to a rectifier (not shown in FIG. 1) configured to rectify an alternating line voltage supplied by, for example, the power grid. That is, the input voltage $V_{IN}$ which is supplied to the switching converter 1 may be provided by a rectifier. Alternatively, the input voltage $V_{IN}$ may be provided by a different sources depending on the application. In the following description, the part of the circuitry physically coupled to the primary winding is referred to as "primary side" and the part of the circuitry coupled to the secondary winding is referred to as "secondary side". Thus all circuitry on the primary side is galvanically isolated from any circuitry on the secondary side. Signals, which are to be transmitted from the secondary side to the primary side, have to be transmitted using a galvanically isolating signal path, such as an opto-coupler, a coreless transformer or the like.

The secondary winding $L_S$ of the flyback converter 1 is coupled to a load 50 for supplying output power thereto. The load 50 may be a battery charger or any other electrical load. The flyback converter 1 further comprises a power semiconductor switch $T_1$ for controlling the current flow through the primary winding $L_P$ (denoted as primary current $i_P$). That is, the semiconductor switch $T_1$ is configured to switch the primary current $i_P$ on and off in accordance with a respective control signal $V_G$. The circuit arrangement further comprises a current sense unit 15 that provides a current sense signal $V_{CS}$ representing the primary current $i_P$ through the primary winding $L_P$. The current sense unit 15 may include, for example, a shunt resistor (see, e.g., resistor $R_{CS}$ in FIG. 2) connected in series to the primary winding $L_P$, and the voltage drop across that shunt resistor represents the primary current $i_P$. However, other current sensing approaches may be applicable. The circuit arrangement further comprises a control unit 10 that generates the control signal $V_G$ supplied to the semiconductor switch $T_1$ to switch it on and off in accordance with this control signal $V_G$. The semiconductor switch $T_1$ may be, for example, a MOS field effect transistor. In this case the control signal $V_G$ may be the gate voltage or the gate current applied to the MOS transistor.

Generally, control unit 10 controls the switching operation of the flyback converter 1. In the present example shown in FIG. 1, the control unit 10 is configured to control the flyback converter such that it operates in a quasi-resonant (i.e., self-oscillating) mode (QR mode). The control unit 10 may further be configured to compare the current sense signal $V_{CS}$ with a reference signal which may represent a peak primary current. The control signal $V_G$, which controls the switching state of the semiconductor switch $T_1$, is generated in such a manner that the primary current $i_P$ is switched off when the primary current sense signal $V_{CS}$ equals or exceeds this reference signal. In QR mode the semiconductor switch $T_1$ is, for example, switched on when the voltage across the switch $T_1$ is at a (local) minimum. For this purpose, the circuit arrangement may comprise a voltage sense unit 13 for directly or indirectly monitoring the voltage drop across the semiconductor switch during the off-time of the switch in order to allow for detecting the time instant when the voltage drop across the semiconductor switch is at the minimum. Thus, the switching losses and the electromagnetic emissions are minimized. The voltage sense unit 13 may be, for example, an auxiliary winding providing a voltage $V_{AUX}$ representing the voltage drop across the semiconductor switch during the off-time. However, other implementations for voltage sensing may be applicable.

On the secondary side of the transformer included in the flyback converter 1 a voltage controller 16 may be provided. In the present example, the voltage controller 16 is coupled to the switching converter output to receive the output voltage signal or a signal representing the output voltage $V_{OUT}$. The voltage controller 16 is also supplied with a reference voltage $V_{REF}$ representing a desired nominal output voltage. The reference voltage $V_{REF}$ can be regarded as target value for the output voltage regulation. Usually a scaled version $V_{OUT'}$ of the output voltage $V_{OUT}$ and an accordingly scaled reference voltage $V_{REF'}$ is supplied to the voltage controller 16. However, the scaling has no effect on the output as $V_{OUT}/V_{REF}$ always equals $V_{OUT'}/V_{REF'}$. The voltage controller 16 is configured to provide an error signal $V_{FB}$ representing the mismatch between the reference voltage $V_{REF}$ and the actual output voltage $V_{OUT}$. The error signal $V_{FB}$ is fed back to the control unit 10 (e.g., via an opto-coupler 17), and the control unit 10 may counteract the mentioned mismatch by adjusting the switching operation of the semiconductor switch $T_1$ (e.g., by tuning the above-mentioned reference signal representing the peak primary current). The opto-coupler 17 provides a galvanic isolation between the control unit 10 (also referred to as primary side controller) and the voltage controller 16 on the secondary side.

Alternatively, the output voltage regulation may be accomplished without sensing the output voltage on the secondary side. Instead, the output voltage $V_{OUT}$ may be estimated from signals available on the primary side of the transformer (e.g. from the voltage sense unit 13) without using an opto-coupler to transmit a signal representing the output voltage from the secondary side to the control unit 10 on the primary side. Such "Primary Side Control" means that the control unit 10 is capable of regulating the output voltage $V_{OUT}$ thereby using only (measured) signals available on the primary side of the transformer included in the flyback converter 1. As mentioned above, the output voltage $V_{OUT}$ needs not to be sensed at the secondary side and transmitted (via a galvanic isolation) to the control unit 10 (primary side controller). An additional galvanic isolation (such as the opto-coupler 17) in the feedback loop is thus not necessary.

Figure 2:
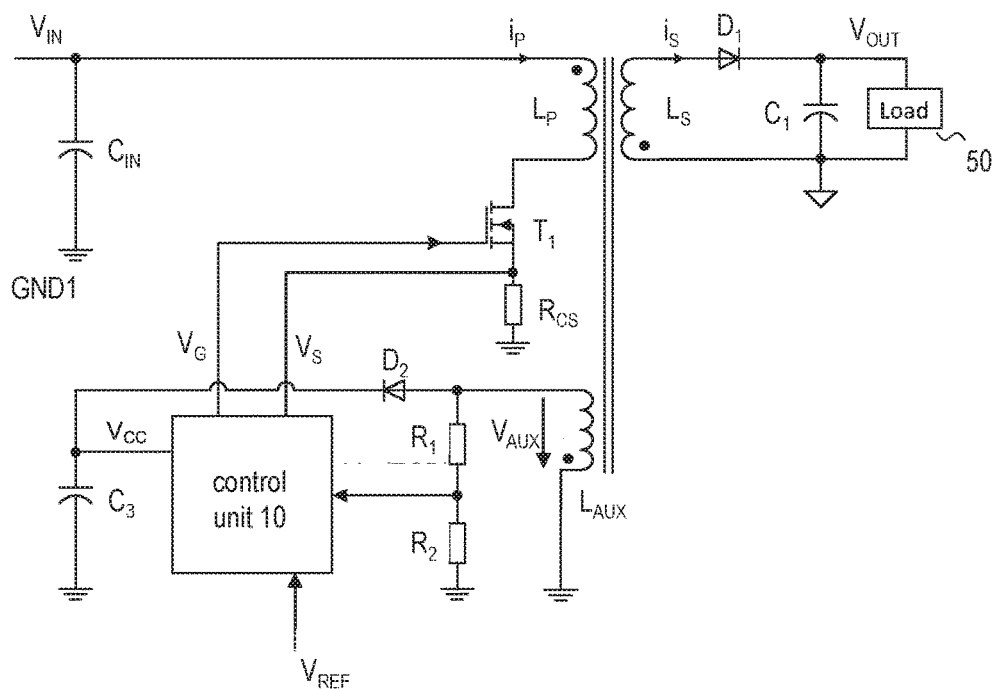
FIG. 2 illustrates the example of FIG. 1 in more detail.

FIG. 2 illustrates one exemplary implementation of the basic structure of FIG. 1 in more detail. However, the voltage controller 16 and the opto-coupler 17 shown in the example of FIG. 1 are not needed in the example of FIG. 2 as the output voltage is estimated from signals available on the primary side (for example from the voltage $V_{AUX}$ at the auxiliary winding $L_{AUX}$) as mentioned above. In accordance with FIG. 2, the output voltage supplied to the load 50 is provided by a buffer capacitor $C_1$ (output capacitor) which is coupled parallel to a series circuit including the secondary winding $L_S$ of the transformer and flyback diode $D_1$. Energy is transferred from the primary side to the secondary side of the transformer in the time intervals during which the transistor $T_1$ is off and the primary current $i_P$ is thus zero. During the same time interval, the buffer capacitor $C_1$ is charged via the flyback diode $D_1$ by the induced current flowing through the secondary winding $L_S$.

The input voltage $V_{IN}$, e.g., the rectified line voltage, is supplied to a series circuit including primary winding $L_P$ and semiconductor switch $T_1$. The semiconductor switch $T_1$ controls the current flow (primary current $i_P$) through the primary winding $L_P$. In the present example, the semiconductor switch $T_1$ is a MOSFET coupled between the primary winding $L_P$ and the ground terminal providing ground potential $GND_1$. A current sense resistor $R_{CS}$ (also referred to as shunt resistor) may be connected between the source terminal of the MOSFET $T_1$ and the ground terminal such that the voltage drops $V_{CS}$ across the current sense resistor $R_{CS}$ represents the primary current $i_P$. It should be noted, that the current sense resistor $R_{CS}$ is just one exemplary implementation of the current sense unit 15 illustrated in FIG. 1. Any other known current measurement method and related circuits are applicable as well. The voltage drop $V_{CS}$ across the current sense resistor $R_{CS}$ is provided as current sense signal to the control unit 10 which generates a gate signal $V_G$ supplied to the control terminal of the semiconductor switch (i.e., the gate electrode in case of a MOSFET) for controlling the switching state thereof.

When the semiconductor switch $T_1$ is switched on, the primary current $i_P$ starts to rise and the energy E stored in the primary winding $L_P$ increases. Since the flyback diode $D_1$ is reverse biased during this phase of "charging" the inductance of the primary winding $L_P$, the primary winding $L_P$ behaves like a singular inductor and the energy E stored in the primary winding equals $E=L_P \cdot i_P^2/2$. When the primary current $i_P$ is switched off by the semiconductor switch $T_1$ the flyback diode $D_1$ becomes forward biased and the energy E is transferred to the secondary winding $L_S$. A secondary current, which results from the energy transfer, charges the output capacitor $C_{OUT}$. The operating principle of the control unit 10 according to which the time instants are determined when the semiconductor switch $T_1$ switches on and off will be discussed later. However, the design of flyback converters is well known in the art and thus not further described herein.

For detecting the time instances, when to switch the primary current on, an auxiliary winding $L_{AUX}$ (having $N_{AUX}$ turns) may be magnetically coupled to the primary winding $L_P$. A first terminal of the auxiliary winding $L_{AUX}$ is coupled to the ground terminal $GND_1$, whereas a second terminal of the auxiliary winding $L_{AUX}$ may be coupled to the control unit 10 via a resistor $R_1$. Actually, a fraction of the voltage $V_{AUX}$ across the auxiliary winding $L_{AUX}$ is supplied to the control circuit 10 via the voltage divider composed of the resistor $R_1$ and a further resistor $R_2$ coupled in series to resistor $R_1$. The series circuit of resistors $R_1$ and $R_2$ is coupled in parallel to the auxiliary winding $L_{AUX}$ and the middle tap of the voltage divider is connected to the control unit 10. The resistors $R_1$ and $R_2$, together with the auxiliary winding $L_{AUX}$ may be regarded as the voltage sense circuit 13 illustrated in the general example of FIG. 1. The voltage divider composed of resistors $R_1$ and $R_2$ effects a simple scaling of the voltage $V_{AUX}$ across the auxiliary winding, and thus may be also regarded as a part of the control unit 10 (or may be omitted completely dependent on the actual implementation). To simplify the illustrations, the voltage divider is not shown in the further Figures.

The auxiliary winding $L_{AUX}$ may further be used for providing a supply voltage $V_{CC}$ to the control unit 10 by means of a supply circuit 12. When the primary current $i_P$ is switched off, the voltage across the auxiliary winding $L_{AUX}$ rises such that the diode $D_2$ is forward-biased and thus allows for charging the supply capacitor $C_3$. However, such supply circuit is well known in present flyback converters and will not be further discussed here.

Flyback converters can be operated in continuous current mode (CCM, in which the secondary current does not drop to zero) and discontinuous current mode (DCM, in which the secondary current drops to zero and remains zero for a finite time). A special case of DCM is the limiting case between DCM and CCM (i.e., the transition between CCM and DCM) and sometimes referred to as critical conduction mode (CrCM), in which the secondary current drops to zero for only a very short time. Another special case of DCM is usually referred to as quasi-resonant mode (QRM), in which the semiconductor switch is switched on at a time instant when the voltage drop across the semiconductor switch is at a minimum as described above. The basic principles of controlling flyback converters in DCM and CCM are well known in the art and thus not explained here in more detail.

In order to control the output voltage $V_{OUT}$ or the output current of the power converter a respective feedback signal (representing the output voltage or current, respectively) may be fed back to the control unit 10. In order to provide a proper galvanic isolation, opto-couplers are usually used in the feedback loop. This situation has been shown in the example of FIG. 1. To simplify the overall switched mode power supply (SMPS) circuit, so called "primary side control" concepts have been developed, according to which the output voltage to be regulated is estimated using measurements accomplished solely on the primary side of the flyback converter. Particularly, the output voltage $V_{OUT}$ may be observed (i.e., estimated) from the measured value of the voltage $V_{AUX}$ obtained from the auxiliary winding $L_{AUX}$. Moreover, the secondary current $i_S$ may be estimated from the measured primary current $i_P$ (i.e., from the current sense signal $V_{CS}$).

Figure 3:
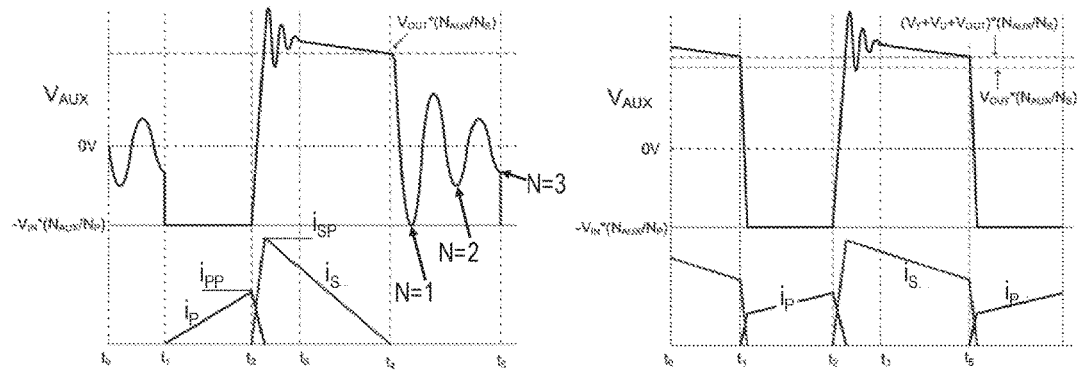
FIG. 3 is a timing diagram illustrating the operation of a flyback controller in general.

FIG. 3 illustrates timing diagrams of the voltage $V_{AUX}$ across the auxiliary winding $L_{AUX}$ and the primary current $i_P$ as well as the secondary current $i_S$. The left diagram of FIG. 3 illustrates the SMPS operating in discontinuous current mode (DCM), more specifically in QRM with switching at the third (N=3) minimum of the drain-source-voltage (represented by $V_{AUX}$) of the semiconductor switch. The right diagram of FIG. 3 illustrates the SMPS operating in continuous current mode (CCM). The timing diagrams are discussed in more detail below. In the left diagram of FIG. 3 the waveforms between the time instant $t_1$ and the time instant $t_5$ (when the semiconductor switch $T_1$ switches on after it has been switched off at time instant $t_2$) are continuously repeated during operation in DCM. At the time instant $t_1$ the semiconductor switch is switched on and the primary current $i_P$ starts ramping up until a maximum current (peak primary current $i_{PP}$) is reached at time instant $t_2$, when the semiconductor switch $T_1$ is switched off again. As a result, the primary current $i_P$ quickly drops to zero, while the secondary current (almost immediately) rises to its maximum value $i_{SP}$ and then ramping down until it reaches zero amperes at time instant $t_4$. During the semiconductor switch $T_1$ is in its on-state (i.e., switched on) between the time instants $t_1$ and $t_2$ the voltage $V_{AUX}$ across the auxiliary winding is almost zero. When the semiconductor switch $T_1$ is switched off at time $t_2$ the voltage $V_{AUX}$ steeply rises up to a maximum voltage. An oscillation of the voltage $V_{AUX}$ may be observed between the time instants $t_2$ and $t_2$ (i.e., during a settling time), and between the time instants $t_3$ and $t_4$ (when the secondary current has dropped to zero) the voltage $V_{AUX}$ drops to the value $V_{OUT}N_{AUX}/N_S$, that is $$V_{OUT}(t_4) = V_{AUX} \cdot N_S/N_{AUX} \text{ (in DCM).} \qquad (1)$$

Equation (1) is valid for DCM only, in which the time instant $t_4$ is the time instant when the secondary current $i_S$ reaches to zero. During the time interval between the time instants $t_4$ and $t_5$ the damped oscillation of the voltage $V_{AUX}$ continues, and—when operating in quasi-resonant mode—the semiconductor switch $T_1$ is switched on again when the voltage $V_{AUX}$ reaches one of the local minima. The time instant when $T_1$ is switched on again and the cycle starts over is denoted with $t_5$. In the present example, the semiconductor switch $T_1$ is switched on at the third local minimum of the voltage signal $V_{AUX}$ (which occurs at time $t_5$). However, other local minima or switching between to local minima may also be done. The example of FIG. 3 illustrates a so-called current mode control. However, voltage mode control would also be an option, in which the peak primary current is not used for determining the switch off time instant of the semiconductor switch $T_1$. However, voltage-mode control and current-mode-control are as such known in the art and not further explained here.

When operating in CCM, the situation is somewhat different as illustrated in the right diagram of FIG. 3. As the secondary current $i_S$ never falls to zero, the forward voltage VD across the flyback diode $D_1$ as well as the voltage VT due to the (ohmic) resistance of the secondary winding $L_S$ adds to the output voltage $V_{OUT}$ in the above-mentioned equation (1). The waveforms in the left diagram (DCM) and the right diagram (CCM) of FIG. 3 are essentially the same except that the semiconductor switch is switched on again before the secondary current $i_S$ has dropped to zero.

Usually, the controller unit 10 (the primary side controller) is optimized (e.g., in terms of efficiency, low electromagnetic interferences, etc.) for a specific regulated output voltage level (e.g., 5 V DC) and a specific range of input voltages (e.g., 180 to 250 V AC). However, in some applications, it is desirable to have either multiple outputs providing different output power or output voltage, or to have an adjustable output power or output voltage. For example, when the load 50 is a battery charger supporting a normal (slow) charging mode and a fast charging mode, it may be desirable to also adjust the output power of the SMPS, as the battery charger will consume more power in the fast charging mode than in the normal charging mode. To increase the output power either the output current or the output voltage (or both) has to increase. Usually it is not desirable to increase the output current (e.g., from 2 A to 4.8 A to increase the power from 10 W to 24 W at the same voltage 5 V) as this would entail more expensive connectors and cables.

To change the output voltage level $V_{OUT}$ (e.g., from 5 V to 12 V to increase the power from 10 W to 24 W at the same current of 2 A) the set-point value (i.e., the desired nominal output voltage $V_{REF}$) used by the output voltage controller 16 may be changed (see also FIG. 1). Due to voltage control loop the actual output voltage $V_{OUT}$ will approach the new set-point value until the output voltage $V_{OUT}$ (approximately) matches the new set-point. However, as the primary side controller (see FIG. 1, control unit 10) is optimized for a specific output voltage $V_{OUT}$ (e.g., 5V) it may operate in a suboptimal state when the set-point value $V_{REF}$ is changed (e.g., to 12 V). Similarly, if the primary side controller is optimized for the changed set point (e.g., 12 V) it may operate in a suboptimal state at the original set-point value (e.g., 5 V). In the embodiments presented herein, the parameter set defining the control characteristics of the primary side controller (see FIG. 1, control unit 10) is also updated when the set-point value for output voltage control is changed in order to overcome the above-mentioned problem of suboptimal (inefficient) operating states. This allows to use an optimized parameter set for the primary side controller for each specific set-point value $V_{REF}$. However, referring back to the example of FIG. 1, the problem which remains is that the primary side controller (FIG. 1, control unit 10) does not really "know" when the set-point value $V_{REF}$ has changed. Upon changing the set-point value the primary side controller merely "sees" a sudden and transient deviation of the actual output voltage from the (changed) set-point.

Figure 4:
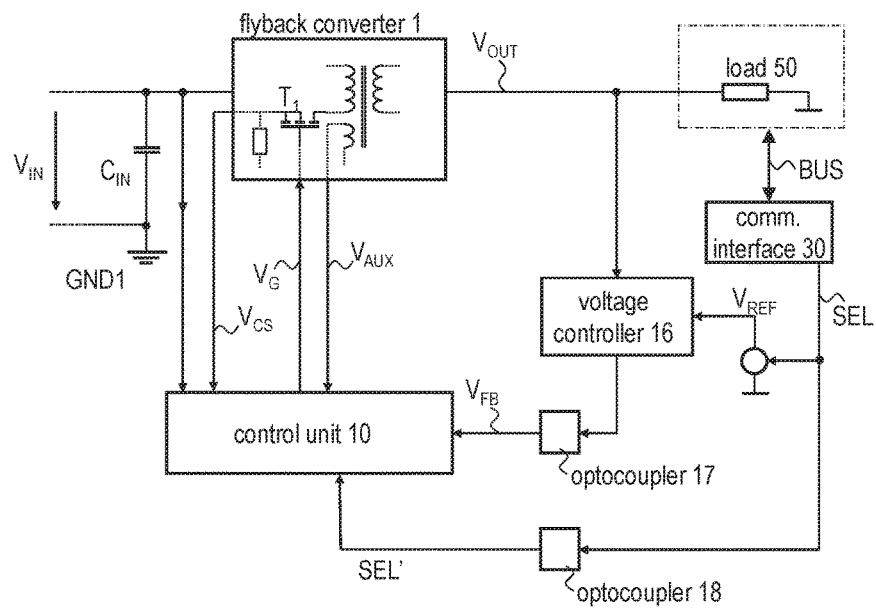
FIG. 4 is a block diagram illustrating a switched mode power supply in accordance with a first embodiment.

FIG. 4 illustrates, as a first example of the invention, a SMPS similar to the example of FIG. 1, wherein additional information concerning a change of the set-point value $V_{REF}$ used for output voltage control is transferred to the primary side controller. This allows the parameter set of the primary side controller to be updated in response to a change of the set-point $V_{REF}$. The updated parameter set may be optimized for the current set-point used in the output voltage control. Summarizing the above, the embodiments described herein are concerned with an SMPS, which includes a detection circuit that is configured to detect a change of the set-point $V_{REF}$ used for output voltage control and to signal such change to the primary side controller. This enables the primary side controller to update its parameter set and to use an optimized parameter set for each specific set-point.

In accordance with the example of FIG. 4, a selection signal SEL is provided to the SMPS. The set-point $V_{REF}$ used by the output voltage controller 16 can be set in accordance with the selection signal SEL. In the important case of only two different set-point values (e.g., $V_{REF}$=5 V and $V_{REF}$=12 V) the selection signal SEL may be a Boolean signal having only two states (e.g., high and low). The selection signal SEL is also provided to the primary side controller 10, e.g., via a further opto-coupler 18, to ensure galvanic isolation between circuitry on the primary side and the secondary side of the transformer included in the flyback converter 1. The output signal of the opto-coupler 18 supplied to the primary side controller 10 is labelled SEL' in FIG. 4. When the selection signal triggers a change of the set-point (e.g., from 5V to 12 V) the information is also provided to the primary side controller 10, which therefor is able to use an updated and optimized parameter set associated with the new set-point.

The selection signal SEL may be provided by any suitable circuit. In the present example, the selection signal SEL generated by a communication interface circuit 30 which receives a respective command (to change the output power) from the connected load 50 via a communication bus (e.g., a Universal Serial Bus). In this configuration the load 50 can "request" a change in the output power of the SMPS by sending an appropriate command via the communication bus.

The remaining components of the example depicted in FIG. 4 are identical to the example of FIG. 1. Accordingly, the SMPS includes a flyback converter 1 having a primary side and a secondary side, which are galvanically isolated by a transformer. The primary winding $L_P$ of the transformer has $N_P$ turns and the secondary winding $L_S$ of the transformer has $N_S$ turns. The primary winding $L_P$ of the flyback converter 1 may be coupled to a rectifier (not shown) which provides the input voltage $V_{IN}$. However, another input voltage source may be used. The secondary winding $L_S$ of the flyback converter 1 is coupled to the load 50 and supplies electrical power thereto. The flyback converter 1 further comprises a power semiconductor switch $T_1$ for controlling the current flow through the primary winding $L_P$ (denoted as primary current $i_P$). That is, the semiconductor switch $T_1$ switches the primary current $i_P$ on and off in accordance with a respective control signal $V_G$, which is provided by the control unit 10 (primary side controller). The current sense signal $V_{CS}$, which represents the primary current $i_P$, is sensed using a sense resistor (indicated as a component of the flyback converter) analogous to the example of FIG. 2. Furthermore, an auxiliary winding $L_{AUX}$ is included in the flyback converter 1 to provide information (voltage $V_{AUX}$) about the time instant at which the semiconductor switch $T_1$ is to be switched on (for quasi-resonant switching, see FIG. 3). The control unit 10 (primary side controller) receives the current sense signal $V_{CS}$ and the voltage $V_{AUX}$ and generates therefrom the control signal $V_G$ which is supplied to the semiconductor switch $T_1$ to switch it on and off. Furthermore the feedback signal $V_{FB}$ (the error signal representing the difference between the actual output voltage $V_{OUT}$ and the set-point $V_{REF}$) are supplied to the control unit 10 to allow for an output voltage control. Finally, the selection signal SEL' is supplied to the control unit 10 as already explained above.

Figure 5:
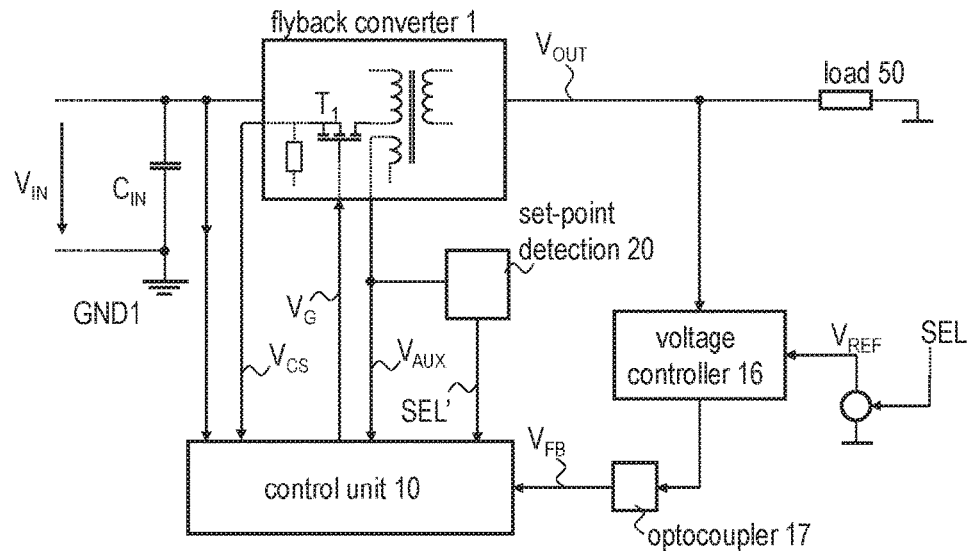
FIG. 5 is a block diagram illustrating a switched mode power supply in accordance with a second embodiment.

In the example of FIG. 4 the detection circuit for detecting the set-point $V_{REF}$ (and thus a change of the set-point $V_{REF}$) includes basically the opto-coupler 18 which transmits the information provided by the selection signal SEL to the primary side controller via a galvanically isolated signaling path. In the example of FIG. 5, the set-point $V_{REF}$ is detected using only information available on the primary side of the switching converter 1 without the need for using a dedicated optocoupler. Accordingly, the detection circuit (labelled set point detection 20 in FIG. 5) receives the voltage provided by an auxiliary winding $L_{AUX}$, which is magnetically coupled to the primary and the secondary winding as illustrated, e.g., in FIG. 2. As can be seen from FIG. 3, a signal representing the output voltage $V_{OUT}$ can be derived from the voltage signal $V_{AUX}$. In the example of FIG. 3, the voltage $V_{AUX}$ is proportional (proportionality factor $N_S/N_{AUX}$) to the output voltage at time instant $t_4$ (when the secondary current $i_S$ reaches zero).

When—in the example of FIG. 5—the set-point used for output voltage control is changed from, e.g., 5 V to 12 V, the output voltage $V_{OUT}$ will change in accordance with the step response of the voltage control loop (formed by the voltage controller 16 and the control unit 10). This change of the output voltage $V_{OUT}$ can be monitored by the detection circuit 20 without directly sensing the output voltage, as the output voltage can be estimated from the voltage $V_{AUX}$. The set-point detection circuit 20 is thus configured to derive a signal SEL' representing the selection signal from the voltage $V_{AUX}$. This signal SEL' is supplied to the control unit 10 which may update its parameter set used for controlling the switching operation of the switching converter 1 to an optimized parameter set associated with the detected set-point. Except the set-point detection described above, the example of FIG. 5 is identical to the example of FIG. 4. However, as the set-point detection circuit 20 uses only signals available on the primary side of the transformer of the switching converter, the second opto-coupler 18 is not needed in the example of FIG. 5 for transmitting the selection signal to the control unit 10. The communication interface circuit 30 shown in FIG. 4 has been omitted in FIG. 5 for the sake of simplicity. Nevertheless, the communication interface circuit (e.g., a USB transceiver) may be used in this and all other embodiments to generate the selection signal SEL received from the load 50 of any other device coupled to the secondary side of the transformer included in the switching converter.

Figure 6:
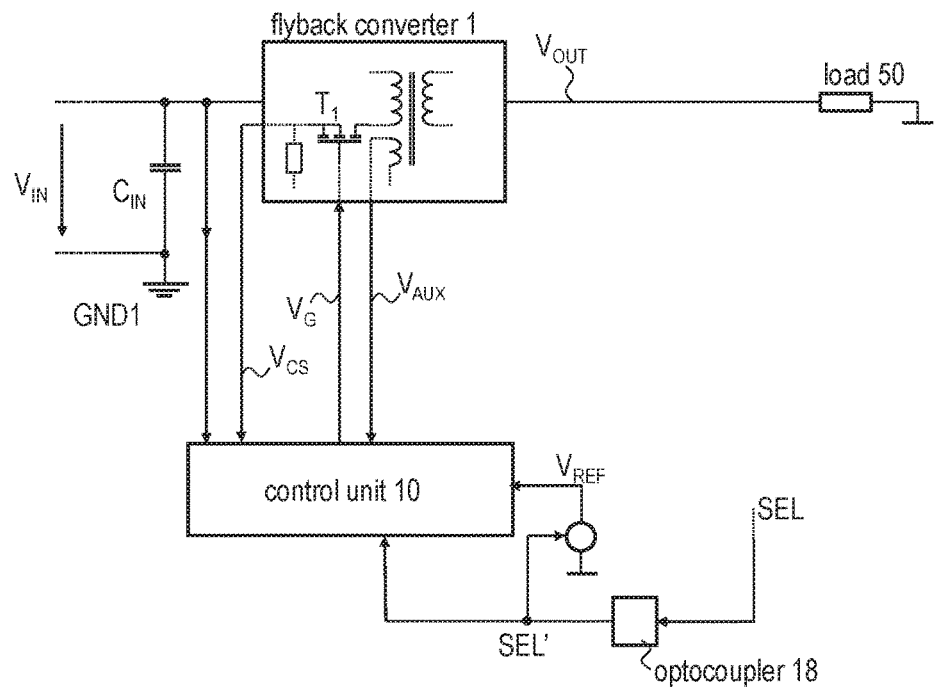
FIG. 6 is a block diagram illustrating a switched mode power supply in accordance with a third embodiment.

FIG. 6 illustrates another embodiment similar to the example of FIG. 4. Different from the previous examples, the voltage controller 16 is not employed on the secondary side of the transformer included in the switching converter 1 but rather included in the control unit 10 (similar to the example of FIG. 2). The output voltage control does not directly sense the output voltage $V_{OUT}$, but rather estimate the output voltage from the voltage $V_{AUX}$ provided by the auxiliary winding $L_{AUX}$. The set-point $V_{REF}$ representing the desired output voltage value is directly supplied to the control unit 10 (which includes the voltage controller). However, the selection signal SEL has to be transmitted from the secondary side to the primary side via the opto-coupler 18 in order to be able to cause a change of the set-point in accordance with the selection signal. Apart from the output voltage control, the circuit of FIG. 6 is identical to the example of FIG. 4.

Figure 7:
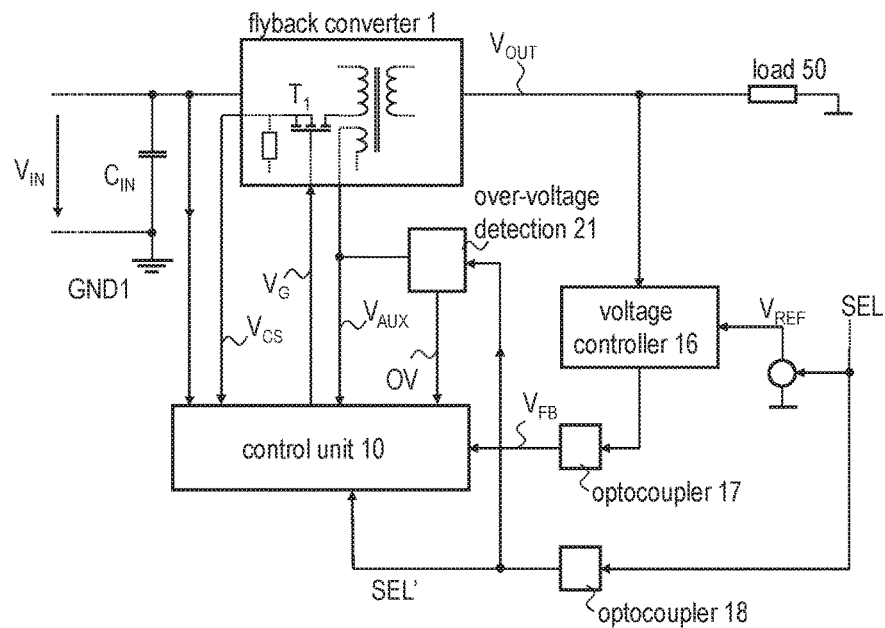
FIG. 7 is a block diagram illustrating a switched mode power supply in accordance with a fourth embodiment which includes an over-voltage protection.

In many applications an over-voltage protection is desired. The example of FIG. 7 is identical to the example of FIG. 4 with an additional over-voltage detection circuit 21. To avoid a third opto-coupler the over-voltage detection circuit 21 may be implemented to derive the output voltage $V_{OUT}$ from the voltage $V_{AUX}$ provided by the auxiliary winding $L_{AUX}$ (see also FIG. 2) and compare it with an over-voltage threshold. In case the over-voltage threshold is exceeded, and over voltage is signaled to the control unit 10 (primary side controller), e.g., by a binary signal OV. However, a more sophisticated approach to detect an over-voltage from the voltage $V_{AUX}$ may be used. Once an over-voltage is detected, the control unit 10 may counteract, e.g., by reducing the peak primary current or by simply shut down the switching converter. In order to be able to distinguish between an actual over voltage and desired increased voltage due to a respectively chosen increased set-point, the selection signal (or any signal representing the selection signal) may be supplied to the over-voltage detection circuit. Accordingly, the over-voltage detection circuit 21 may adjust the threshold used for over-voltage detection dependent on the selection signal SEL or SEL'. For example, in case the selection signal indicates a set-point of 5 V, the threshold used for over-voltage detection may be set to. e.g., 5.5 V. When the selection signal indicates a set-point of 12 V, the threshold used for over-voltage detection may be set, e.g., 13.5 V.

Figure 8:
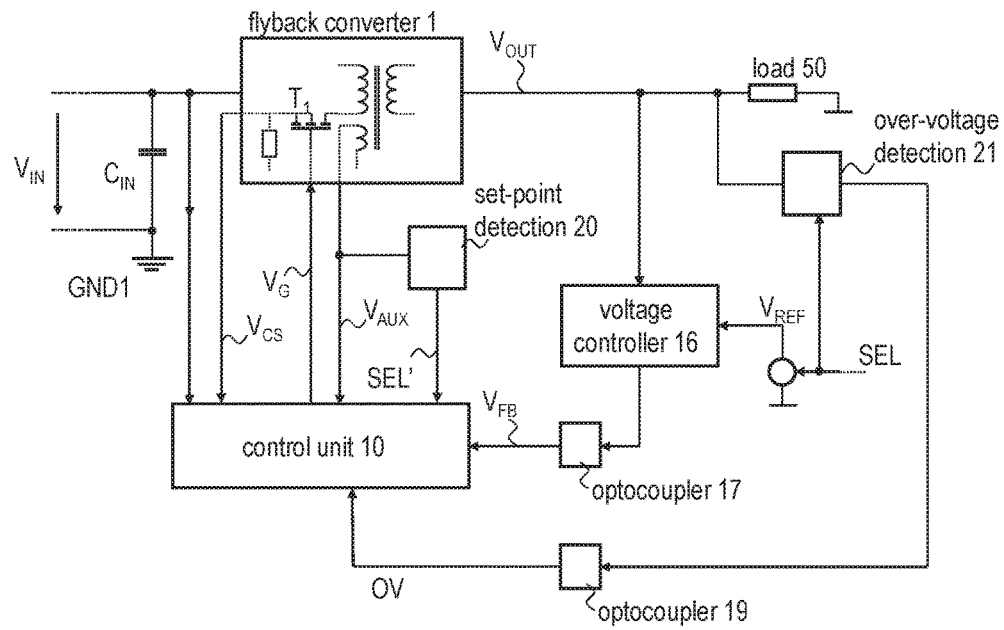
FIG. 8 is a block diagram illustrating a switched mode power supply in accordance with a fifth embodiment which includes an over-voltage protection.
Figure 9:
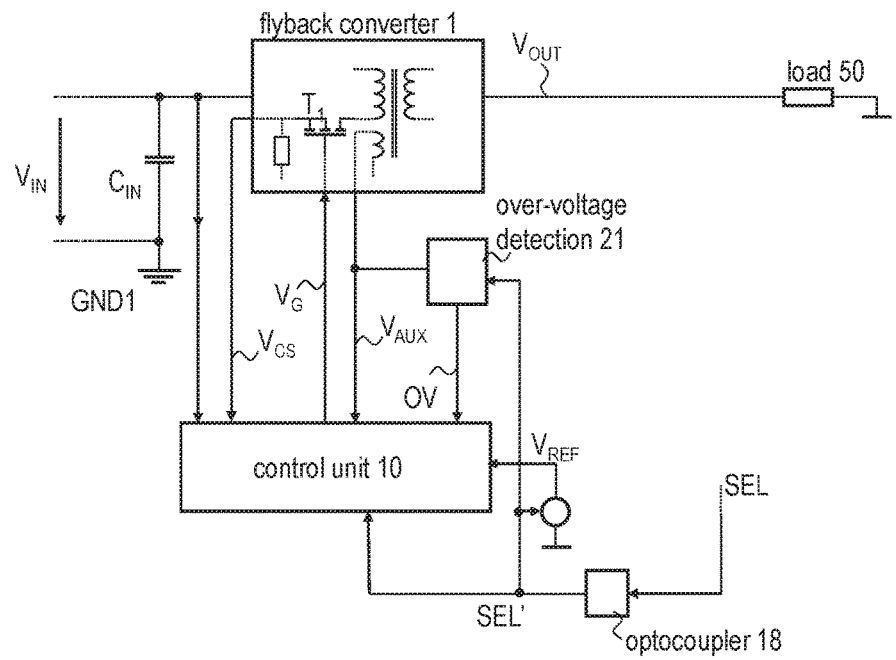
FIG. 9 is a block diagram illustrating a switched mode power supply in accordance with a sixth embodiment which includes an over-voltage protection.
Figure 10:
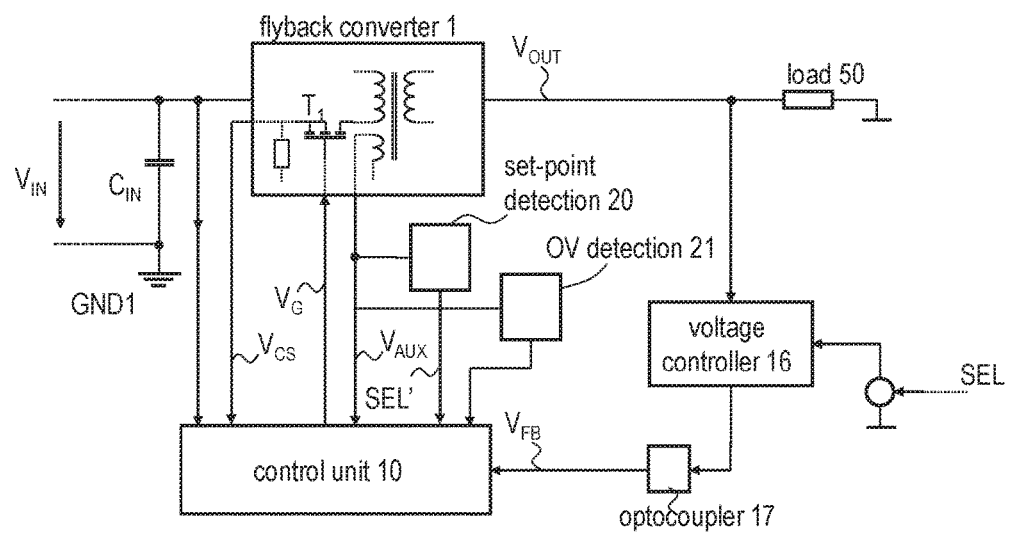
FIG. 10 is a block diagram illustrating a switched mode power supply in accordance with a seventh embodiment which includes an over-voltage protection.

FIGS. 8, 9 and 10 illustrates minor modifications of the example of FIG. 7. In the example of FIG. 8, the set-point detection is implemented in the same manner as in the example of FIG. 5. That is, the value of the selection signal SEL is reconstructed from the voltage $V_{AUX}$ provided by the auxiliary winding $L_{AUX}$ included in the transformer of the switching converter 1. When the set-point used for output voltage control is changed from, e.g., 5 V to 12 V, the output voltage $V_{OUT}$ will change in accordance with the step response of the voltage control loop (formed by the voltage controller 16 and the control unit 10). This change of the output voltage $V_{OUT}$ can be monitored by the detection circuit 20 without directly sensing the output voltage $V_{OUT}$, as the output voltage can be estimated from the voltage $V_{AUX}$. The set-point detection circuit 20 is thus configured to derive a signal SEL' representing the selection signal from the voltage $V_{AUX}$. This signal SEL' is supplied to the control unit 10 which may update its parameter set used for controlling the switching operation of the switching converter 1 to an optimized parameter set associated with the detected set-point. Also different from the previous example, the over-voltage detection senses the output voltage $V_{OUT}$ at the secondary side of the transformer included in the switching converter and thus the overvoltage signal has to be transmitted to the primary side controller 10 via a galvanically isolating signal path, e.g., via the opto-coupler 19.

In the example of FIG. 9, the over-voltage detection circuit 21 is implemented as in the previous example of FIG. 7, and the output voltage control is included in the primary side controller (control unit 10) as explained with reference to FIG. 6. The example of FIG. 10 is identical to the example of FIG. 7 except that the set-point detection and the over-voltage detection is accomplished based on monitoring the of the voltage $V_{AUX}$ provided by the auxiliary winding of the transformer included in the switching converter 1. The set-point detection circuit 20 may be implemented in a similar manner as in the example of FIG. 8. Different from the previous examples no selection signal is directly available to the over-voltage detection circuit 21 for choosing the correct over-voltage detection threshold as explained above with reference to FIG. 7. It may therefore, be difficult to distinguish a change of the set-point (e.g., from 5 V to 12 V) from an over voltage, as an output voltage of, e.g., 12 V may be considered as an over-voltage for a set-point of 5 V, whereas it perfectly matches a set-point of 12 V. By analyzing the signal waveform of the (estimated) output voltage $V_{OUT}$, an over-voltage situation can, nevertheless, be distinguished from a change in the set-point. In case the set-point is abruptly set to a new value, the output voltage signal reacts in a well-defined manner, i.e., in accordance with the (known) step response of the voltage control loop (formed by the voltage controller 16 and the control unit 10). This is, however, usually not the case in an actual over-voltage situation. As a further option, the current set-point may be signaled to the primary side via other channels. For example, the voltage controller may modulate the feedback signal to signal the current set-point to the control unit 10. Alternatively, the voltage controller may be configured to modulate the output current, which would entail a respective modulation of the input current, which can be detected on the primary side. The modulated signals mentioned above can be demodulated on the primary side and the information about the set-point can thus be reconstructed on the primary side and provided to the control unit 10, the set-point detection circuit 20 and/or the over-voltage detection circuit 21.

The embodiments above have been described using a flyback converter as an illustrative example. It is understood, that a flyback converter may be replaced by other types of switching converters, which provide a galvanic isolation between a primary side and a secondary side. In the embodiments described above, the parameter set used by the control unit 10 (i.e., the primary side controller), which controls the switching operation of the switching converter, is updated when a change of the set-point (i.e., a new set-point) is detected. The updated parameter set may be optimized for the new set-point, and each possible set-point may be associated with a specific parameter set to be used together with the respective set-point. The parameter set may include, inter alia, criteria for switching off the semiconductor switch $T_1$ (e.g., the maximum primary current), criteria for switching on the semiconductor switch $T_1$ (e.g., at the first, second, third, etc., local minimum of the voltage $V_{AUX}$ as illustrated in FIG. 3), criteria for mode switches from DCM to CCM and vice versa, the transfer characteristics from the error signal $V_{FB}$ (see FIG. 4) and the peak primary current $i_{PP}$, etc.

Furthermore, the embodiments described above relate to power supplies with two different output voltages and thus there are two selectable set-point (e.g., 5 V and 12 V) to be used for output voltage control. This allows a comparably simple implementation as the selection signal is a Boolean signal (1-bit signal) having only to discrete signal levels (high and low). Nevertheless, more than two set-points may be readily implemented. In that cases the corresponding selection signal may be a multi-bit signal or a multi-level signal which can assume more than two signal levels. Alternatively, the information included in the selection signal may be transmitted to the primary side using a serial bus (such as i2c bus or similar). In the example illustrated in FIG. 10, the information conveyed by the selection signal SEL in the previous embodiments is now included in the information, which is digitally transmitted from the load 50 to the control unit 10 on the primary side via a galvanic isolation 30. In the present example such digital transmission accomplished using a serial bus (such as the Universal Serial Bus (USB) or similar serial busses or point-to-point connections) and the galvanic isolation 30 is achieved using an integrated coreless transformer. However, other bus standards and systems may be used as well as different techniques for providing a galvanic isolation such as opto-couplers or the like. USB is, however, widely used to connect mobile devices with personal computers, battery chargers or other removable devices.

Figure 11:
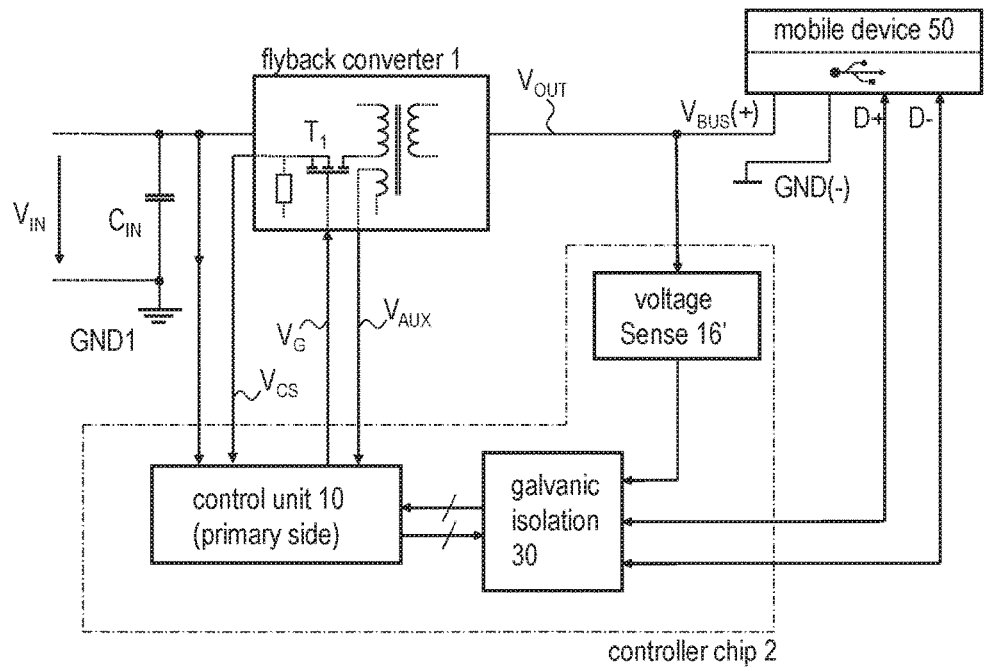
FIG. 11 is a block diagram illustrating a switched mode power supply in accordance with a further embodiment of the invention which includes galvanically isolated data transmission from the load to the switching controller.

The example of FIG. 11 illustrates an SMPS very similar to the example of FIG. 4. The switching converter is essentially identical to the previous examples. However, data received by the SMPS from the load 50 (which may be a mobile device such as a mobile phone, a tablet computer, etc.) is directly forwarded to the control unit 10 (i.e., the primary side controller) via galvanic isolation 30 such as a coreless transformer or an opto-coupler. A coreless transformer may be integrated on the same chip or in the same chip package as the primary side controller. By directly forwarding the received data to the control unit 10 on the primary side the electronic which has to be provided on the secondary side can be very effective (with regard to costs and form factor) without the need for "intelligent" electronic components such as microcontrollers. Basically, the electronics on the secondary side can be reduced to some buffer and driver circuits providing the signal transmission (without any digital signal processing, signal coding or decoding or the like) via the galvanic isolation 30. The mentioned buffer and driver circuits are not shown in FIG. 11 and may also be included in the circuit 30 providing the galvanic isolation.

Furthermore, a voltage sense circuit 16' (or a simple voltage controller) may be provided on the secondary side. The voltage sense circuit may be configured to provide a signal representing the output voltage and may include one or more buffers, amplifiers, impedance converters, analog-to-digital converters, etc. In the present example, a signal representing the output voltage $V_{OUT}$ ($V_{OUT}=V_{BUS}$) is communicated to the control unit 10 via the galvanic isolation 30. As mentioned above, the galvanic isolation may include one or more coreless transformers or one or more opto-couplers or any combination thereof.

In the example of FIG. 11, the load 50 is a mobile device which is configured to communicate information to the SMPS using a serial bus. In many applications a four wire bus cable may be uses similar or analogously to the USB standard. The switching converter output line is connected to the supply line $V_{BUS}$ of the USB cable, and the ground line GND of the USB cable is connected to ground potential at the secondary side of the SMPS. The two data lines D+ and D− are coupled to the primary side controller (control unit 10) via the galvanic isolation 30. The decoding of the serial data stream transmitted on the data lines through the galvanic isolation is decoded and further processed by the primary side controller. Thus, the "intelligence" of the SMPS control is concentrated in the primary side controller. The data transmission between primary side controller and the load may be unidirectional (load to controller unit 10) or bidirectional. The primary side controller 10, the galvanic isolation, the voltage sense 16' circuit and further circuitry may be integrated on the same chip or included in one chip package (even when using more than one semiconductor die). The structure of the system described above allows a very efficient design and avoids redundant components (e.g., programmable logic or processors) on the primary and the secondary side.

Figure 12:
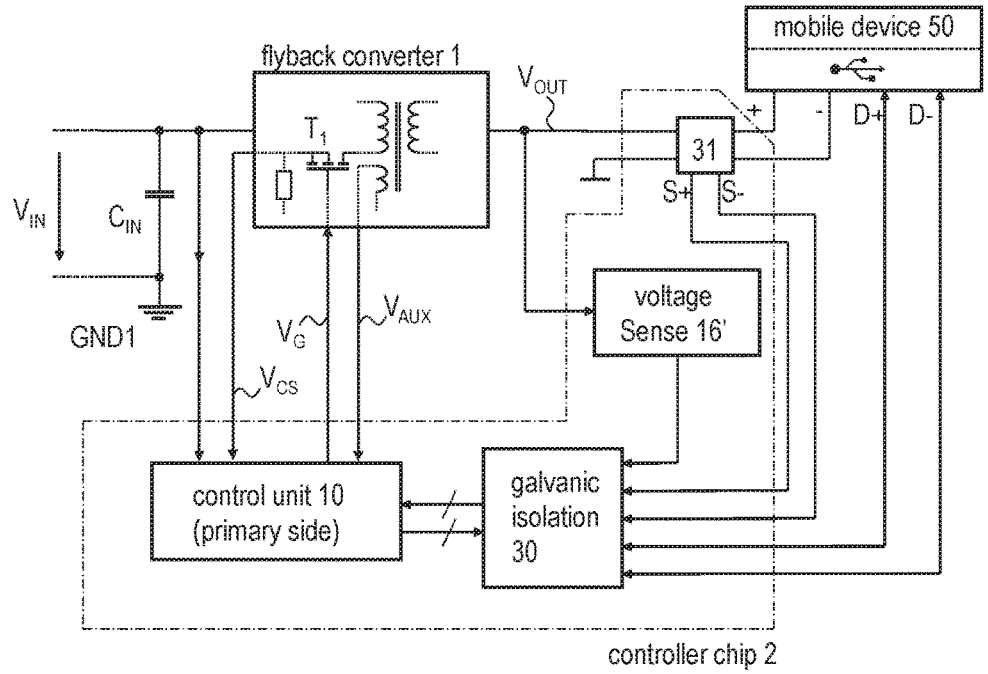
FIG. 12 is a block diagram illustrating a further embodiment similar to the embodiment of FIG. 11.

The example illustrated in FIG. 12 is essentially the same as the example of FIG. 11. However, the example of FIG. 12 additionally includes a signal buffer circuit 31 which is configured to generate signals S+ and S− which represent the current the supply lines $V_{BUS}$ and GND of the bus cable. Some loads 50 may be configured to modulate the load current provided by the SMPS to transmit information to the SMPS. The buffer circuit 31 may be configured to generate signals S+ and S− which represent the modulated current through the supply lines of the BUS. Similar to the data lines D+ and D−, the signals S+ and S− may be directly supplied to the primary side controller via the galvanic isolation circuit 30. Dependent on the application, the whole communication between load 50 and SMPS is accomplished without the data lines D+ and D−. In that case, the data transmission is done only by modulating the load current, wherein the signals S+ and S− representing the modulated current signals are forwarded to the primary side controller via the galvanic isolation 30 and the data lines D+ and D− may remain unconnected. The buffer circuit 31 may thus be a current sense circuit, configured to provide a signal representing the current flowing through the supply lines $V_{BUS}$ and GND. The buffer circuit 31 may include one or more sense resistors, one or more amplifiers, analog-to-digital-converters, etc.

The primary side controller 10, the galvanic isolation, the voltage sense circuit 16', the buffer circuit 31 and further circuitry may be integrated on the same chip or included in one chip package (even when using more than one semiconductor die). As mentioned above, the structure of the system described above allows a very efficient design and avoids redundant components (e.g., programmable logic or processors) on the primary and the secondary side.

The SMPS described herein may be used, for example, to charge a battery included in the load 50, e.g., a mobile device. The data communicated from the load 50 to the primary side controller may include, for example, information concerning the charging mode (e.g., normal charging, fast charging, etc.), the battery status (battery fully charged, battery fault, etc.), the desired output voltage or current, compatibility information, etc. Furthermore, information can be transmitted from the SMPS (e.g., from the primary side controller) to the load 50, e.g., to inform the connected mobile device about the available charging modes, the maximum output current or voltage, etc.

Figure 13:
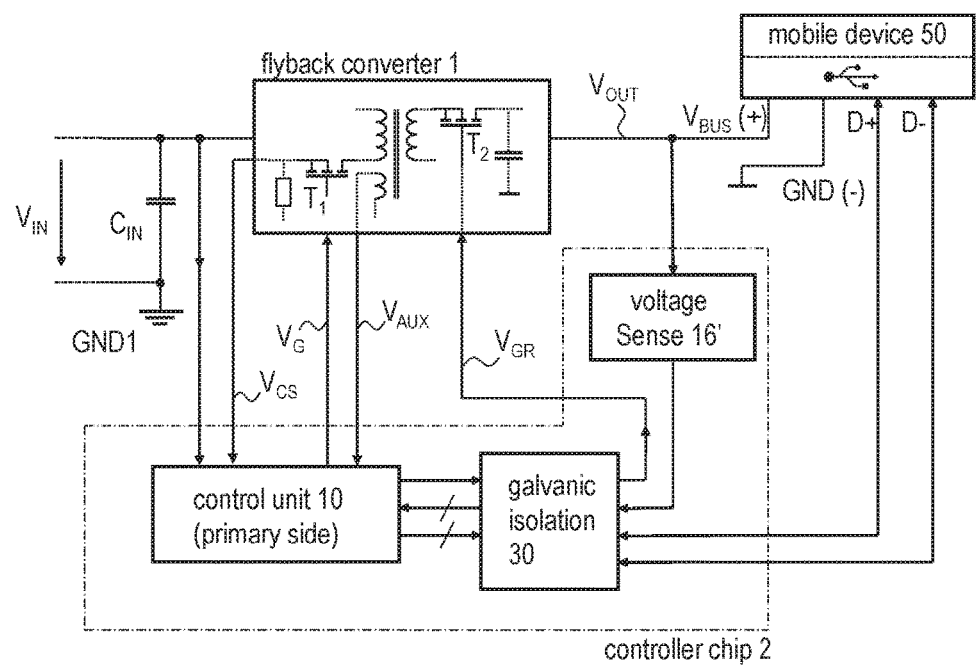
FIG. 13 is a block diagram illustrating a further embodiment similar to the embodiment of FIG. 11 using a synchronous rectifier on the secondary side.

The example of FIG. 13 is essentially the same as the previous example of FIG. 11. However, the switching converter 1 includes a synchronous rectifier $T_2$ instead of a free-wheeling diode (see diode $D_1$ in the example of FIG. 2). The synchronous rectifier is implemented using a MOS transistor $T_2$ connected in series to the secondary winding $L_S$ at the secondary side of the transformer included in the switching converter (see also FIG. 2). Using a synchronous rectifier allows further reduction of losses and higher overall efficiency as compared to the use of a free-wheeling diode. However, a synchronous rectifier entails more sophisticated control mechanisms to ensure a synchronous switching of the rectifying MOS transistor $T_2$, which is not required for a free-wheeling diode.

In accordance with the present example, the primary side controller (control unit 10) generates the drive signal $V_{GR}$ for the synchronous rectifier included in the switching converter 1 (i.e., the gate signal for MOS transistor $T_2$), and the drive signal is then transmitted to the secondary side via the galvanic isolation 30 (opto-coupler or transformer). As all the information concerning the switching information of the switch $T_1$, which switches the primary current, is readily available to the control unit 10 on the primary side, the control unit 10 is able to generate the drive signal for the synchronous rectifier on the secondary side very precisely and with high accuracy, thus improving allover efficiency of the switching converter.

Although exemplary embodiments and its advantages have been described in detail, it should be understood that various changes, substitutions and alterations can be made herein without departing from the spirit and the scope of the invention as defined by the appended claims. Particularly, numeric values for voltages, currents and resistances are provided for illustrative purposes only and are not to be regarded as limiting in any way. Analog electronics may be replaced by digital circuitry performing the same function. With the above range of variations and applications in mind, it should be understood that the present invention is not limited by the foregoing description, nor is it limited by the accompanying drawings. Instead, the present invention is limited only by the following claims and their legal equivalents.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Finally, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

What is claimed is:

1. A switched mode power supply circuit comprising:
   a switching converter receiving an input voltage and generating an output voltage from the input voltage in accordance with a switching signal, wherein the switching converter includes a primary winding, a secondary winding, an auxiliary winding, and a semiconductor switch coupled in series to the primary winding for switching a primary current on and off in accordance with the switching signal, wherein the primary winding is configured to operably carry a primary current, the secondary winding is configured to operably carry a secondary current, and the auxiliary winding is configured to operably provide a first voltage signal;
   a voltage controller configured to generate a feedback signal based on a set-point and a signal representing the output voltage, wherein the set-point is based on a received selection signal;
   a switching controller unit configured to generate the switching signal in accordance with the feedback signal and a control parameter set such that the output voltage approximately matches a target output voltage represented by the set-point; and
   a detection circuit coupled to the auxiliary winding and configured to identify the set-point based on the first voltage signal received from the auxiliary winding, and to signal the identified set-point to the switching controller unit,
   wherein the switching controller unit is further configured to update the control parameter set in response to the identified set-point.

2. The switched mode power supply circuit of claim 1, wherein the feedback signal is supplied to the switching controller unit via a galvanically isolating signal path.

3. The switched mode power supply circuit of claim 1,
   wherein the detection circuit is configured to receive the selection signal and to forward it to the switching controller unit via a first galvanically isolating signal path; and
   the switching controller unit being configured to update the control parameter set in accordance with the selection signal received via the first galvanically isolating signal path.

4. The switched mode power supply circuit of claim 1,
   the switching controller unit being configured to update the control parameter set in accordance with a value of the identified set-point signaled by the detection circuit.

5. The switched mode power supply circuit of claim 1,
   wherein the detection circuit is configured to receive the selection signal and to forward it to the switching controller unit via a first galvanically isolating signal path; and
   the switching controller unit being configured to update the control parameter set in accordance with the selection signal received via the first galvanically isolating signal path.

6. The switched mode power supply circuit of claim 5, wherein the switching controller unit includes a voltage controller that receives the set-point and a signal representing the output voltage, which is estimated from the first voltage signal.

7. The switched mode power supply circuit of claim 1, further comprising an over-voltage detection circuit that receives a signal representing the output voltage and that is configured to provide, to the switching controller unit, an over-voltage signal based on the received signal representing the output voltage.

8. The switched mode power supply circuit of claim 7,
wherein the over-voltage detection circuit senses the output voltage; and
wherein the over-voltage signal is transmitted to the switching controller unit via a galvanically isolating signal path.

9. The switched mode power supply circuit of claim 7,
wherein the over-voltage detection circuit receives the first voltage signal and generates therefrom a signal representing the output voltage.

10. The switched mode power supply circuit of claim 1, further comprising a communication interface configured to receive commands over a communication bus and to generate the selection signal based on the received commands.

11. The switched mode power supply circuit of claim 10,
wherein the communication interface receives, over the communication bus, commands from an electronic device supplied with the output voltage generated by the switching converter; and
wherein the communication interface generates a selection signal when receiving a corresponding selection command from the electronic device.

12. A power conversion method comprising:
receiving, from an input power source, an input voltage by a switching power converter, wherein the switching power converter includes a primary winding, a secondary winding, an auxiliary winding, and a semiconductor switch coupled in series to the primary winding for switching a primary current on and off in accordance with a switching signal, wherein the primary winding is configured to operably carry a primary current, the secondary winding is configured to operably carry a secondary current, and the auxiliary winding is configured to operably provide a first voltage signal;
generating, using the switching power converter, an output voltage from the input voltage in accordance with the switching signal;
generating, using a voltage controller, a feedback signal based on a set-point and a signal representing the output voltage, wherein the set-point is based on a received selection signal;
generating, using a switching controller, the switching signal in accordance with the feedback signal and a control parameter set such that the output voltage approximately matches a target voltage represented by the set-point;
identifying the set-point based on the first voltage signal received from the auxiliary winding;
signaling the identified set-point to the switching controller; and
updating the control parameter set in response to the identified set-point.

13. The power conversion method of claim 12, wherein signaling the identified set-point to the switching controller comprises transmitting the selection signal via a galvanically isolating transmission path.

14. A switched mode power supply circuit comprising:
a switching converter configured to receive an input voltage and to generate an output voltage from the input voltage in accordance with a switching signal, the switching converter configured to be coupled to a transformer that provides a galvanic isolation between a primary side and a secondary side of the switching converter;
a switching controller unit configured to generate the switching signal in accordance with a control parameter set and dependent on input data received via a galvanically isolated transmission path such that the output voltage approximately matches a set-point; and
a detection circuit configured to detect a change of the set-point and to signal the changed set-point to the switching controller unit, wherein the switching controller unit is further configured to update the control parameter set in response to a detected change of a set-point value, and the input data includes a serial data stream provided by a load supplied with the output voltage.

15. The switched mode power supply circuit of claim 14, further comprising a voltage sense circuit configured to provide a signal representing the output voltage, the signal representing the output voltage being transmitted to the switching controller unit via the galvanically isolated transmission path.

16. The switched mode power supply circuit of claim 15, wherein the switching controller unit includes a voltage controller that receives a set-point and the signal representing the output voltage and is configured to generate the switching signal based on the set-point and the signal representing the output voltage.

17. The switched mode power supply circuit of claim 14, further comprising a buffer circuit coupled to an output of the switching converter and configured to provide a signal representing output current supplied to a load connected to the output.

18. The switched mode power supply circuit of claim 17, wherein the signal representing the output current is transmitted to the switching controller unit via the galvanically isolated transmission path.

19. The switched mode power supply circuit of claim 14, wherein:
the control parameter set defines control characteristics of the switching controller unit; and
the control parameter set includes at least one of: criteria for switching off a semiconductor switch of the switching converter, criteria for switching on the semiconductor switch, or criteria for mode switching of the switching converter from DCM to CCM and vice versa.

20. The switched mode power supply circuit of claim 14, wherein:
the control parameter set defines control characteristics of the switching controller unit; and
the control parameter set includes at least one of: criteria for switching off a semiconductor switch of the switching converter, criteria for switching on the semiconductor switch, or criteria for mode switching of the switching converter from DCM to CCM and vice versa.

21. The switched mode power supply circuit of claim 14, wherein the detection circuit is configured to detect the changed set-point based on a voltage received from an auxiliary winding of transformer.

22. The power conversion method of claim 12, wherein:
the control parameter set defines control characteristics of the switching controller; and the control parameter set includes at least one of: criteria for switching off a semiconductor switch of the switching power converter, criteria for switching on the semiconductor switch, or criteria for mode switching of the switching power converter from DCM to CCM and vice versa.

\* \* \* \* \*